Oct. 21, 1952  H. E. MEGGITT  2,614,437
CONTROL MEANS FOR VEHICLE MIRRORS, FOG LIGHTS, AND THE LIKE
Filed May 10, 1950
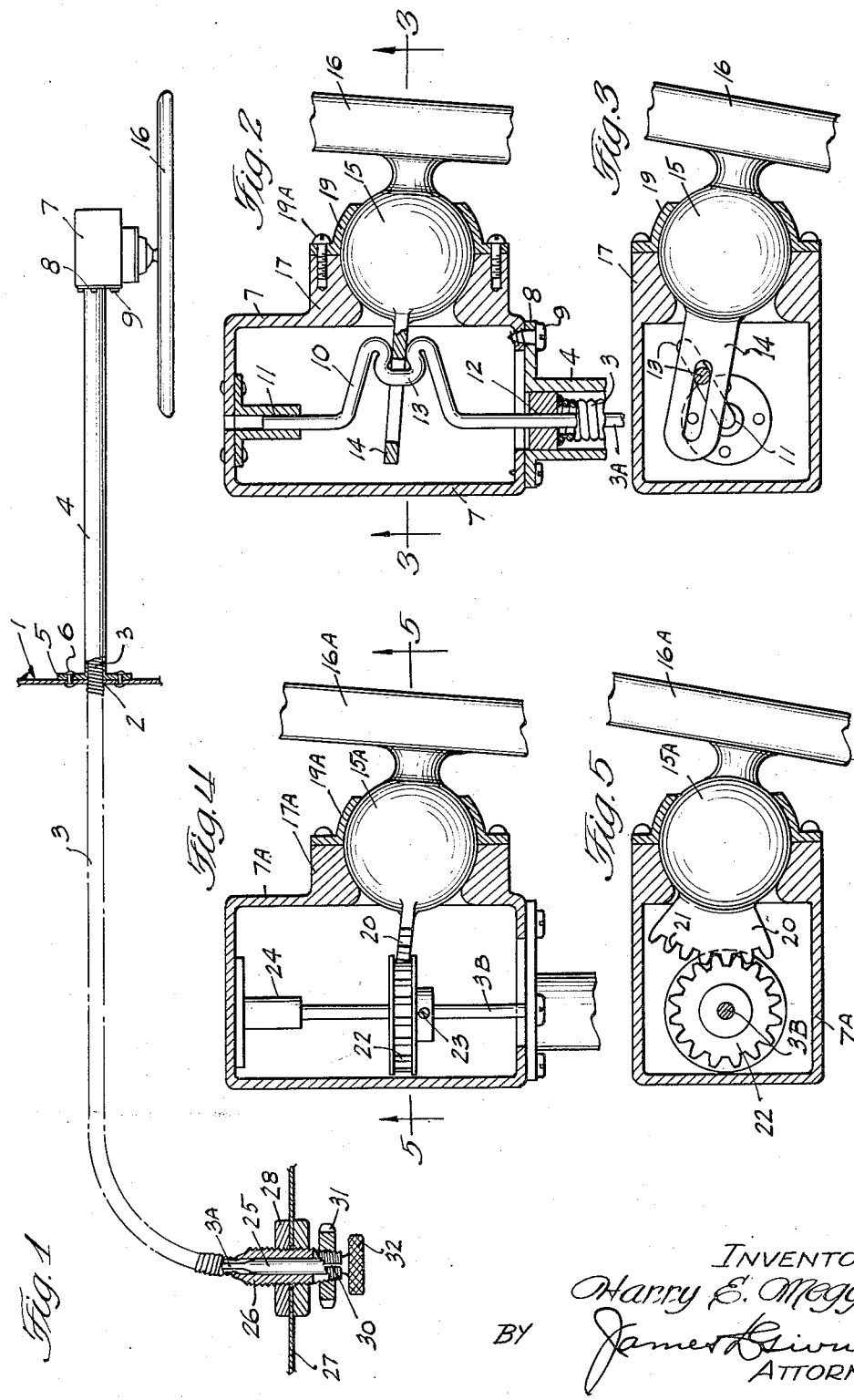

Patented Oct. 21, 1952

2,614,437

UNITED STATES PATENT OFFICE 2,614,437

CONTROL MEANS FOR VEHICLE MIRRORS, FOG LIGHTS, AND THE LIKE

Harry E. Meggitt, Portland, Oreg.

Application May 10, 1950, Serial No. 161,229

1 Claim. (Cl. 74—501)

This invention relates to improvements in means controllable and settable from the interior of a vehicle for adjusting and locking into an adjusted position an accessory on the exterior of the vehicle such as a rear vision mirror, spotlight or the like.

It is one of the principal objects of the invention to provide a device of this character by means of which an accessory mounted on the outside of the body or cab of the vehicle on the right hand side thereof and out of reach of the driver who is normally positioned on the left hand side of the cab may be conveniently and accurately adjusted into the desired position by the driver of the vehicle without leaving his position on the left hand side thereof.

These and other objects will appear as my invention is more fully hereinafter described in the following specification, illustrated in the accompanying drawing and finally pointed out in the appended claim.

In the drawing:

Figure 1 is a top plan view of the invention with parts in section and fragments broken away for convenience of illustration.

Figure 2 is an enlarged sectional top plan view of a mounting for the accessory in the form of a housing within which a position of the control means is disposed.

Figure 3 is a sectional view taken approximately along the line 3—3 of Figure 2.

Figure 4 is a view similar to Figure 2 illustrating a modified form of the invention.

Figure 5 is a sectional view taken approximately along the line 5—5 of Figure 4.

Referring now more particularly to the drawing:

In Figure 1 reference numeral 1 indicates generally one side wall of a cab or an enclosed body of a vehicle which is apertured at as 2 for the passage therethrough of a flexible wire housing indicated at 3. The housing 3 after passing through the wall 1 extends into a tube 4 flanged at one of its ends as at 5 and secured by means of rivets or the like as indicated at 6 to said wall and terminating at its opposite end in open communication with a housing 7.

The tube 4 is secured to the housing 7 by means of an integral flange 8 secured by means of screws, bolts or the like as indicated at 9 to the housing. As best illustrated in Figure 2 an actuating wire 3A extends through the housing 3 and tube 4 and at one of its ends is attached to or terminates in a crank shaft generally indicated at 10 journaled as at 11 and 12 in bearings formed at opposite ends of said housing 7. The intermediate portion of the crank 10 is of bifurcated formation as at 13 for operatively embracing a slotted lug 14 formed integral with and extending outwardly from a ball 15 to which is attached a rear vision mirror or other fixture generally indicated at 16. The ball 15 is mounted for universal movement within a socket comprising a part 17 formed integral with the housing 7 and a cap 19 removably secured thereto by means of screws or bolts indicated at 19A.

In the modified form of the invention illustrated in Figures 4 and 5 the housing 7A is formed with the ball and socket arrangement comprising a ball 15A and the socket parts 17A and 19A. The mirror or other fixture 16A is secured to the ball 15A. Cast integral with or secured to the ball 15A is a gear segment 20 whose teeth 21 engage with the teeth of a driving gear 22 which is locked as at 23 to the end portion of the wire 3B which is slidably and rotatably mounted in a bearing 24 at its outermost end and is the equivalent of the wire 3A shown in Figures 1, 2 and 3.

In both forms of the invention the opposite end of the wire 3A or the wire 3B is enlarged into or secured to a shaft portion 25 slidably mounted within a bushing 26 which is secured to the dashboard or other structural part of the vehicle as at 27 by means of a nut 28 and a lock nut 29 operable on the external threads of the bushing 26. The outer end of the bushing is split longitudinally as at 30 and tapered as shown to receive a binding nut 31 adapted to compress the split end of the bushing into firm gripping engagement with the shaft portion 25 of the wire for holding the wire in any adjusted position. The shaft portion 25 of the wire terminates in a knurled finger grip 32 by means of which the wire may be advanced or retracted for swinging the mirror in one plane and rotated for swinging the mirror in another. As illustrated in Figures 2 and 3 rectilinear movement of the wire 3A will by means of the engagement of the bifurcated portion 13 of the crankshaft with the slotted lug 14 rotate the ball either in a clockwise or counterclockwise direction as viewed in Figure 2. Rotation of the wire 3A, or crankshaft, will, of course, swing the ball in either a clockwise or counterclockwise direction as viewed in Figure 3.

Reciprocal motion of the wire 3B in Figures 4 and 5 will impart rotary motion to the ball 15A either in a clockwise or counterclockwise direction by means of the engagement of the gear segment 20 with the gear 22 between the flanges thereof. Rotation of the wire 3B and the gear 22 will through the gear segment 20 impart rotation to the ball 15A in either a clockwise or counterclockwise direction as viewed in Figure 5.

When the mirror is finally adjusted, it is locked into position by the binding nut 31 which as aforesaid will securely lock the wire and its shaft portion 25 in its adjusted position.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

An article of the class described comprising in combination an accessory for a vehicle, a ball secured to said accessory, a housing adapted to be secured to the vehicle, a socket formed on said housing to receive said ball, a rotatably and slidably mounted flexible shaft having one of its ends extending into said housing, means operatively connecting said one end of said shaft with said ball, said means comprising a gear-rack formed on the ball, and a gear wheel attached to said shaft and engaged with said gear-rack for imparting universal movement to the ball and accessory upon sliding and rotating said shaft.

HARRY E. MEGGITT.

REFERENCES CITED

The following references are of record in the file of this patent:

UNITED STATES PATENTS

| Number | Name | Date |
|---|---|---|
| 244,290 | Pennington | July 12, 1881 |
| 1,411,048 | McCosh | Mar. 28, 1922 |
| 1,416,119 | Nichols | May 16, 1922 |
| 1,577,153 | Aldeen | Mar. 16, 1926 |
| 1,601,976 | Mayer | Oct. 5, 1926 |
| 1,630,217 | Rasor | May 24, 1927 |
| 1,688,214 | Walden | Oct. 16, 1928 |
| 1,826,105 | Veale | Oct. 6, 1931 |
| 2,066,981 | Koca | Jan. 5, 1937 |
| 2,472,438 | Price | June 7, 1949 |
| 2,573,127 | Von Bredow | Oct. 30, 1951 |

FOREIGN PATENTS

| Number | Country | Date |
|---|---|---|
| 621,098 | Germany | Oct. 10, 1935 |